Sept. 26, 1961 C. D. VREELAND III 3,001,339
SICKLE AND MOWER KNIFE SHARPENING SUPPORT
Original Filed June 19, 1958
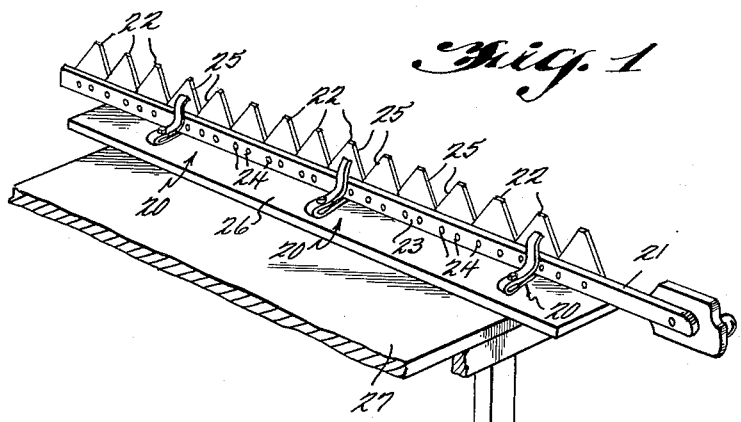
Fig. 1
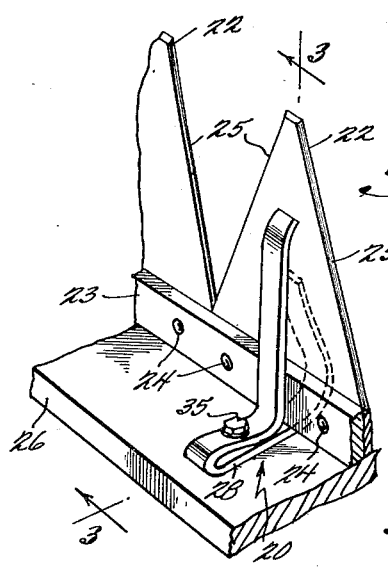
Fig. 2
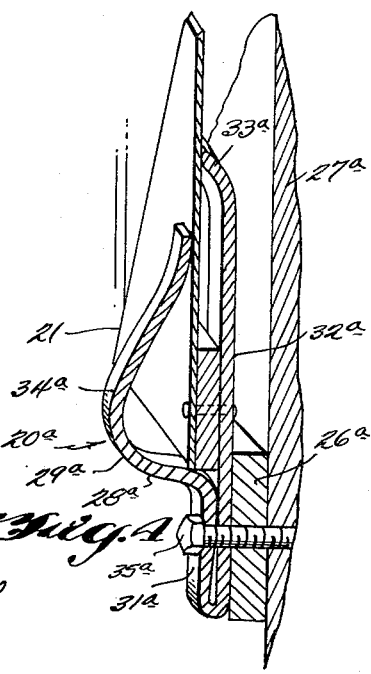
Fig. 3
Fig. 4
INVENTOR
CORNELIUS D. VREELAND, III.
BY Kimmel & Crowell
ATTORNEYS 3,001,339
SICKLE AND MOWER KNIFE SHARPENING
SUPPORT
Cornelius D. Vreeland III, Thunder Hill,
Middlefield, Mass.
Original application June 19, 1958, Ser. No. 743,077.
Divided and this application Feb. 3, 1959, Ser. No.
790,966
1 Claim. (Cl. 51—222)

The present invention relates to a support for supporting a sickle and mower knife while being sharpened by a hand held sharpening attachment for electric drills.

The primary object of the invention is to provide a sickle and mower knife sharpening support which will hold the sickle and mower knife firmly and in a position so that the sharpening operation may be conducted with unobstructed vision.

Another object of the invention is to provide a supporting bracket for holding a sickle bar or mower blade in position for sharpening, or grinding, such that the sickle bar or mower blade can be inserted and removed by a quick and easy hand operation.

A further object of the invention is to provide a sickle and mower knife sharpening support which is inexpensive to manufacture, easy to use, convenient to place on a bench, table or machine, and self-engaging in its gripping action of the sickle bar.

Other objects and advantages will become apparent in the following specification when considered in light of the attached drawings, in which:

FIGURE 1 is a fragmentary perspective view of the invention with a sickle bar supported therein;

FIGURE 2 is an enlarged fragmentary perspective view of one of the supports with the sickle bar engaged therein;

FIGURE 3 is a vertical sectional view taken along the line 3—3 of FIGURE 2, looking in the direction of the arrows; and FIGURE 4 is a fragmentary perspective view of a modified form of the invention shown partially broken away and in section for convenience of illustration.

The present application is a division of my co-pending application Serial No. 743,077 filed June 19, 1958, now Patent No. 2,971,299 entitled Sickle and Mower Knife Sharpener Attachment for Electric Drills.

Referring now to the drawings in detail wherein like reference characters indicate like parts throughout the several figures, the reference numeral 20 indicates generally a support for clamping a sickle bar 21 in upright position to permit the triangular cutting blades 22 thereof to be sharpened by a hand held grinding tool (not shown).

The sickle bar 21 is of conventional construction and includes a generally rectangular elongated cutter bar 23 to which the triangular cutting blades 22 are secured by rivets 24 in a conventional manner. The cutting blades 22 are each provided with a pair of outwardly converging edges 25 which are sharpened for use in a mowing machine in the usual manner.

An elongated board 26 comprising a hose is supported on a table or bench 27 and can be clamped or bolted thereto if desired. A plurality of supporting brackets 20 are arranged in spaced relation along the board 26. Each bracket is made of medium gauge resilient sheet metal and includes a generally horizontal flat portion 28 which extends transversely of the board 26 in engagement with one face thereof, with one end 29 thereof extending beyond the side edge 30 of the board 26.

The flat portion 28 of the supporting bracket 20 has a reverted portion 31 integrally connected to the end of the flat portion 28 oppositely of the end 29. A generally flat perpendicularly extending bar 32 is integrally joined to the reverted portion 31 at the end thereof opposite its connection to the horizontal portion 28. The bar 32 has an arcuate offset terminal end 33 extending in the direction of the end 29 of the flat portion 28.

An upstanding clamping bar 34 is integrally joined to the end 29 of the flat portion 28 and is arranged to slope toward the bar 32, terminating below the arcuate offset end 33 thereof. The upstanding bar 32 and the clamping bar 34 are formed of resilient material and are biased toward each other to clamp a sickle bar 21 placed therebetween.

In engaging the sickle bar 21 in the support brackets 20, the lower edge of the cutter bar 23 is engaged between the upper end of the clamping bar 34 and the upright bar 32 and is then pressed downwardly into engagement with the horizontal portion 28, as shown in FIGURE 3, after which the grinding operation is carried out on the cutting blades 22.

A bolt 35 extends through the reverted portion 31 and the flat portion 28 of the support 20 and on through the board 26. The bolt 35 is held to the board 26 by a nut 36 engaged in a socket 37 in the lower face of the board 26.

In FIGURE 4 a modified form of the invention is illustrated wherein the supporting bracket 20A is supported on a wall 27A in spaced relation with respect thereto along a horizontally extending baseboard 26A engaged against the wall 27A.

The support bracket 20A includes a flat upright bar 32A engaged against the outer face of the baseboard 26A and having an outwardly arcuately offset terminal end 33A at the upper end thereof. A reverted portion 31A is integrally joined to the lower end of the bar 32A and extends upwardly therewith.

The reverted portion 31A has an outwardly extending offset portion 28A integrally formed on the upper end thereof and having at its outer end 29A a clamping bar 34A integrally joined thereto and extending upwardly therefrom, sloping inwardly toward the upright bar 32A and terminating at a point spaced below the arcuately offset terminal end portion 33A of the upright bar 32A.

A bolt 35A extends through the reverted portion 31A, the upright bar 32A, the board 26A, into the wall 27A, to secure the support bracket 20A to the board 26A and the wall 27A. The sickle bar 21 is engaged with the support bracket 20A between the resilient bars 32A, 34A in the same manner as it is engaged with the support bracket 20 of the preferred form of the invention.

The support bracket 20 and the support bracket 20A firmly secure the sickle bar 21 in an upright position so that the outwardly converging edges 25 of the cutting blades 22 are in an easily accessible position and are clearly visible to permit the grinding sharpening operation to take place thereon.

Having thus described the preferred embodiments of the invention, it should be understood that numerous structural modifications and adaptations may be resorted to without departing from the scope of the appended claim.

What is claimed is:

A support for holding a sickle bar for mowers having cutter blades thereon while the latter are being sharpened, comprised by an elongated base having a top and a side at right angles, a plurality of mounting brackets on said base, each bracket being comprised by a resilient strip of medium gauge sheet metal doubled back on itself and including a bottom section adapted to rest on said base and having a hole therein, a first curved portion on said bottom section positioned beyond the side of said base, and an upwardly and inwardly extending first clamping end integral with said first curved portion and terminating in a vertical plane parallel to the side of said base, and said strip including a top section having a hole therein aligned with the hole in the bottom section, a second curved portion integral with said top section, a vertically positioned portion integral with said second curved portion, and an upwardly and outwardly extending second clamping end integral with said vertically extending portion and terminating in a vertical plane parallel to the vertical plane of the first clamping end and spaced from the latter at a distance approximately equal to the combined thickness of the sickle bar and the blades, and a bolt extending through the aligned holes in the top and bottom sections of the strips for securing the latter to the base.

References Cited in the file of this patent

UNITED STATES PATENTS

| | | |
|---|---|---|
| 662,793 | Kennedy | Nov. 27, 1900 |
| 703,212 | Neuens | June 24, 1902 |
| 1,107,033 | Clark | Aug. 11, 1914 |
| 2,825,042 | Tollefson et al. | Feb. 25, 1958 |

FOREIGN PATENTS

| | | |
|---|---|---|
| 455,620 | Canada | Apr. 5, 1949 |
| 664,826 | France | Sept. 9, 1929 |